United States Patent [19]

Schmidt

[11] Patent Number: 5,078,528
[45] Date of Patent: Jan. 7, 1992

[54] ECCENTRIC BUSHING FOR WORE OUT MACHINE ADJUSTMENT

[76] Inventor: La Vern Schmidt, P.O. Box 234, Montzeuma, Kans. 67867

[21] Appl. No.: 278,763

[22] Filed: Dec. 2, 1988

[51] Int. Cl.$^5$ .............................................. F16D 1/00
[52] U.S. Cl. ................................ 403/4; 403/DIG. 8; 403/365
[58] Field of Search .................... 403/4, DIG. 8, 365, 403/351

[56] References Cited

U.S. PATENT DOCUMENTS 3,124,370 3/1964 Traugott ........................ 403/161 X
4,243,339 1/1981 Dickerson ............................... 403/4
4,420,272 12/1983 Ingalls et al. .......................... 403/4

Primary Examiner—Andrew V. Kundrat
Attorney, Agent, or Firm—Richard L. Miller

[57] ABSTRACT

This eccentric bushing is designed to save mechanics/operators of agricultural planters money and time in replacement of common bushings formerly employed in these machines. Primarily, the bore of this bushing is eccentric/skewed on its axis and is received on a pin of a frame of a planter, and by its manual adjustment will cause a rubber depth gauge wheel to re engage a disc of the planter to keep the disc sharp.

1 Claim, 2 Drawing Sheets

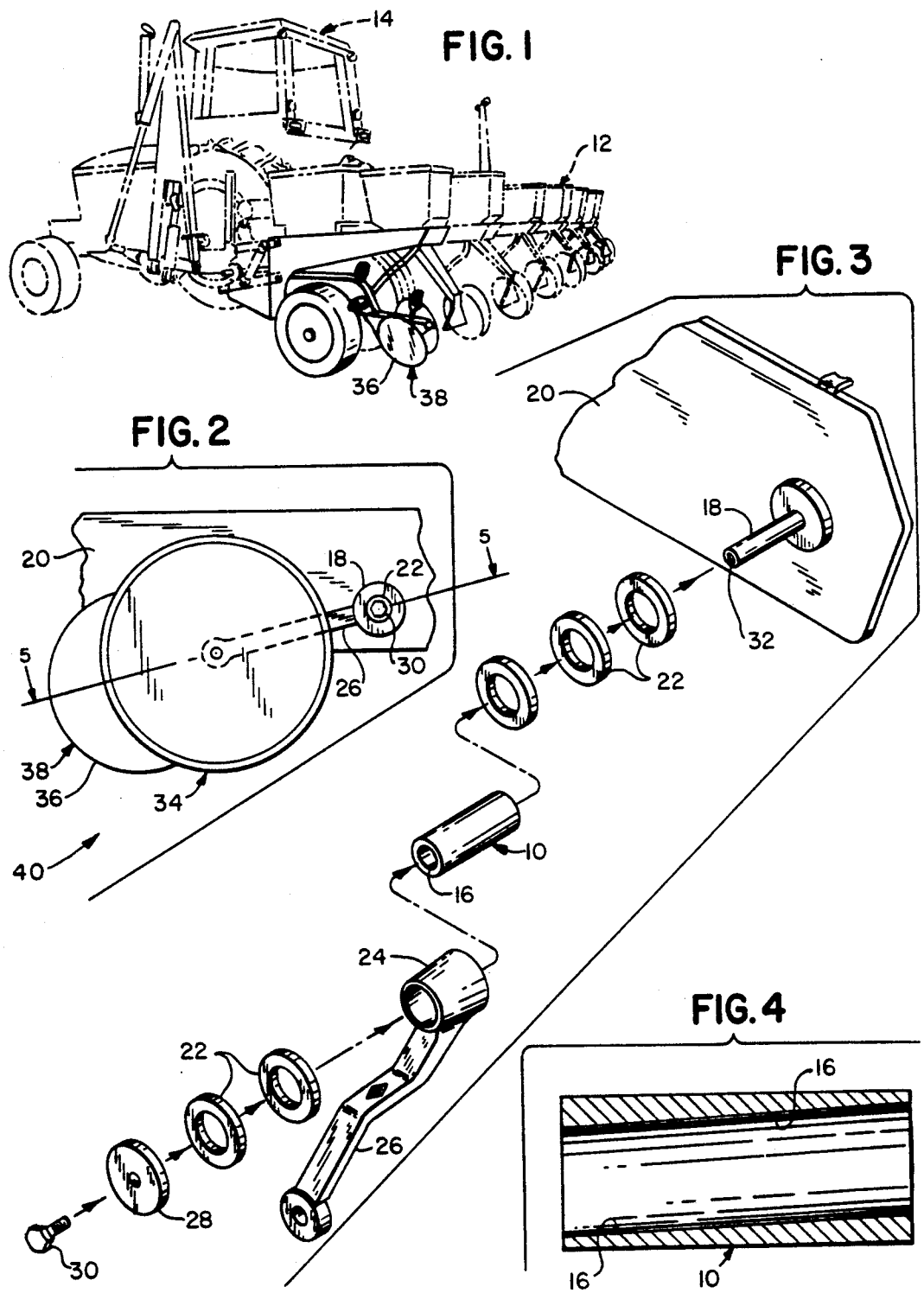

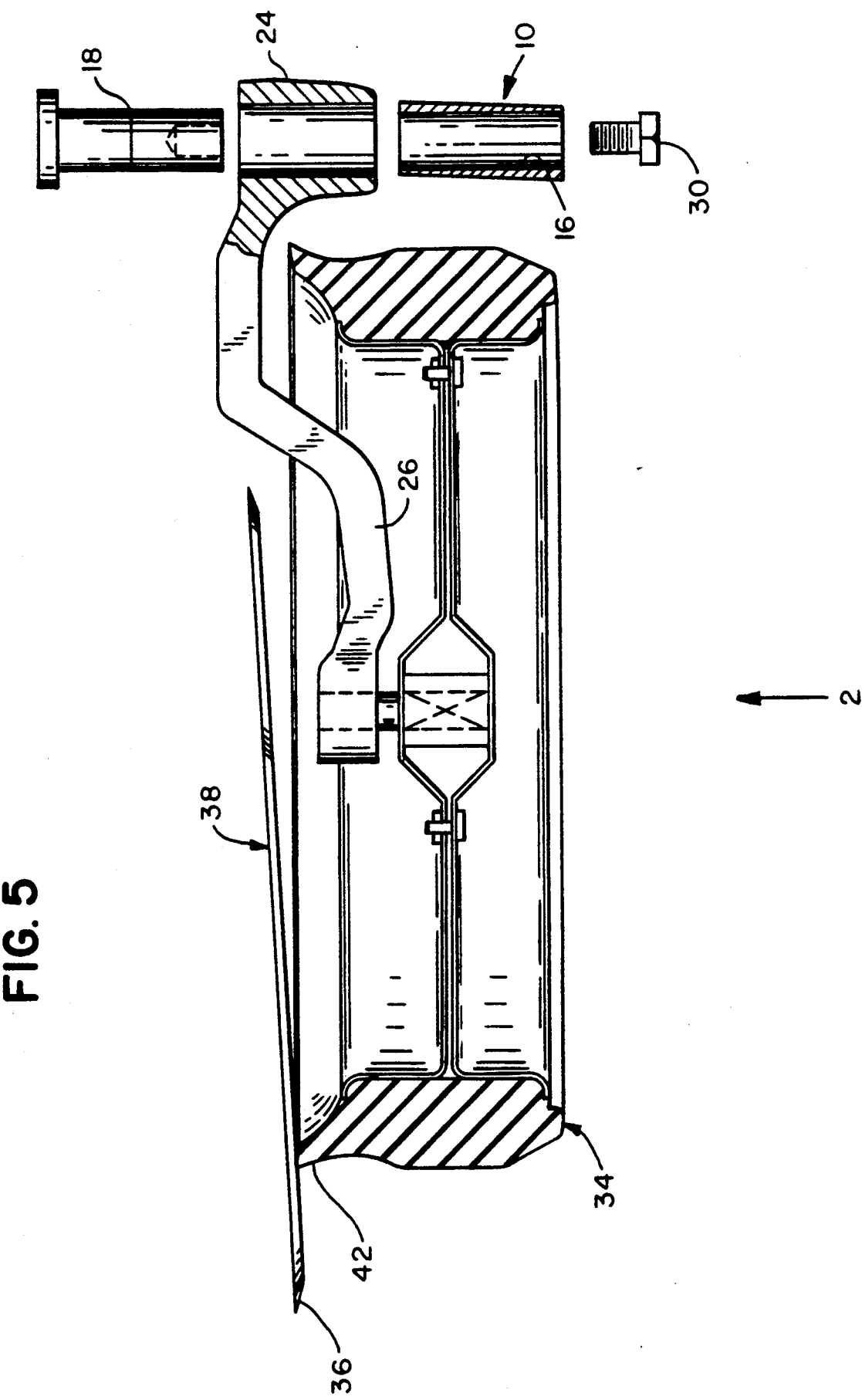

ECCENTRIC BUSHING FOR WORE OUT MACHINE ADJUSTMENT

BACKGROUND OF THE INVENTION

The instant invention relates generally to farm machinery, and more particularly, to an eccentric bushing for worn out machine adjustment.

Numerous sleeve devices have been provided in the prior art that are adapted to rectify a machine problem. For example, U.S. Pat. Nos. 3,836,698 of Bawa; 1,983,368 of Hathorn; and 1,800,578 of Webb all are illustrative of such prior art. While these units may be suitable for the particular purpose to which they address, they would not be suitable for the purpose of the present invention as hereafter described.

SUMMARY OF THE INVENTION

A primary object of the present invention is to provide an eccentric bushing for worn out machine adjustment that will overcome the shortcomings of the prior art devices.

Another object is to provide an eccentric bushing for worn out machine adjustment that will be of such design, as to prevent the often necessary replacement of the plain bushings provided on depth gauge mechanisms of agricultural planter machines.

An additional object is to provide an eccentric bushing for worn out machine adjustment that will be so designed, as to keep a depth gauge wheel against a disc to be sharpened without often time consuming disassembly of the components of the planter to replace a worn bushing.

A further object is to provide an eccentric bushing for worn out machine adjustment that is simple and easy to use.

A still further object is to provide an eccentric bushing for worn out machine adjustment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is perspective view of the tractor seed spacing accessory employing the instant invention, the tractor being shown in phantom;

FIG. 2 is an enlarged front elevational view of an assembly, shown removed therefrom, in the direction of arrow 2 of FIG. 5;

FIG. 3 is an exploded perspective view of the tractor seed spacing accessory per se, with the eccentric bushing invention 10 installed thereon;

FIG. 4 is a side cross sectional view off the eccentric bushing per se shown removed from the assembly; and FIG. 5 is an enlarged fragmentary cross sectional view taken along line 5—5 of FIG. 2.

DETAILED DESCRIPTION OF THE PREFERRED EMBODIMENTS

Turning now descriptively to the drawings, in which like reference characters denote like elements throughout the several views, an eccentric bushing 10 for a planter 12 that is towed behind a farm tractor 14, is shown to include a bore 16 that is eccentric with its longitudinal axis for a purpose which will hereinafter be described. It is to be noted that the axis of the bore through the bushing is actually skewed with respect to the axis of the outer cylindrical surface of the bushing per se, that is although these two axis are not parallel they do most likely intersect with each other.

In order to better understand the nature and the function of the instant invention which is the bushing 10 per se and how it cooperates with the machinery on which it is installed a partial description of the machinery will be explained as follows:

Bushing 10 is received on pin 18 welded to main frame 20, and shim washers 22 are received on pin 18. Bushing 10 is received in shim washers 22 and sleeve portion 24 of depth gauge arm 26, and arm 26 is received on pin 18. Other shim washers 22 and a plain washer 28 are received against sleeve portion 24 of arm 26, and a bolt fastener 30 is received through washer 28 and is threaded into threaded opening 32 of pin 18 for fastening the assembly together.

Normally, the rubber tire depth gauge wheel 34 mounted on the other end of depth gauge arm 26, is in engagement with cutting edge 36 of disc 38 that enters the soil, and this engagement serves to keep cutting edge 36 constantly sharp for the operation of the planter 12 in planting row crop grain. It also keeps the disk clean of mud so that dry dirt does not fall back with the seed that is being planted.

In use, eccentric bushing 10 is rotated by the use of pliers until contact is made between the disc 38 and the abrading edge 42 of the depth gauge wheel 34, and after the above, the assembly 40 is again tightened with the bolt fastener 30.

Because the axis of the bore through the bushing 10 is skewed with respect to the outer cylindrical surface of the bushing per se as previously described allows a mechanic to adjust the engagement between cutting edge 36 of disc 38 and abrading edge 42 of the depth gauge wheel 34, in order to compensate for the wear of the disc, the abrading edge, the bushing itself, and a multitude of many other misalignments.

This realignment may accomplished without removing any major heavy parts from the equipment, and also allows the bushing to be used for a greater number of hours than a conventional bushing which has its bore concentric with its outer cylindrical surface.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An eccentric bushing assembly for worn out machine adjustment of an agricultural planter comprising an eccentric bushing formed with a through-bore eccentric and skewed with a longitudinal axis of the bushing; a mounting sleeve for receiving the bushing; a mounting pin having an enlarged mounting end and an internally threaded opposite end for insertion into the bushing through-bore; and, a locking bolt threadably engageable in the threaded end of the mounting pin thereby to lock the mounting bushing between the mounting sleeve and the mounting pin, whereby slackening the locking bolt enables adjustments of the rotational position of the eccentric bushing relative to the mounting sleeve.

* * * * *